United States Patent
Nakazato et al.

(10) Patent No.: US 10,180,228 B2
(45) Date of Patent: Jan. 15, 2019

(54) VEHICLE LIGHTING FIXTURE

(71) Applicant: Stanley Electric Co., Ltd., Tokyo (JP)

(72) Inventors: Yoshiaki Nakazato, Tokyo (JP);
Mitsuhiro Uchida, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 165 days.

(21) Appl. No.: 15/077,201

(22) Filed: Mar. 22, 2016

(65) Prior Publication Data

US 2016/0281951 A1    Sep. 29, 2016

(30) Foreign Application Priority Data

Mar. 23, 2015  (JP) .................................. 2015-059940

(51) Int. Cl.
*F21V 7/00* (2006.01)
*F21S 8/10* (2006.01)
(Continued)

(52) U.S. Cl.
CPC ........ *F21S 48/1742* (2013.01); *B60Q 1/0041* (2013.01); *B60Q 1/12* (2013.01); *B60Q 1/143* (2013.01); *B60Q 1/18* (2013.01); *F21S 41/14* (2018.01); *F21S 41/16* (2018.01); *F21S 41/255* (2018.01); *F21S 41/336* (2018.01); *F21S 41/43* (2018.01); *F21S 41/657* (2018.01);
(Continued)

(58) Field of Classification Search
CPC .... F21S 48/137; F21S 48/1747; F21S 48/145; F21S 41/60; F21S 41/67; F21S 41/68; F21S 41/40; F21S 41/43; B60Q 1/0041; B60Q 1/18; B60Q 2300/45; B60Q 2300/112; B60Q 2300/42; B60Q 1/16; B60Q 1/24; F21W 2102/13; F21W 2102/00
See application file for complete search history.

(56) References Cited

U.S. PATENT DOCUMENTS

| | | | |
|---|---|---|---|
| 2005/0063192 A1* | 3/2005 | Tatara | F21S 41/689 362/512 |
| 2005/0094411 A1* | 5/2005 | Ishida | B60Q 1/0041 362/538 |

(Continued)

FOREIGN PATENT DOCUMENTS

| | | |
|---|---|---|
| JP | 2008-34279 A | 2/2008 |
| JP | 2012-243727 A | 12/2012 |

(Continued)

OTHER PUBLICATIONS

Yamamoto, Vehicular Illumination Lamp, Jan. 31, 2013, JP2013020781A, English.*

*Primary Examiner* — Bryon T Gyllstrom
*Assistant Examiner* — James Endo
(74) *Attorney, Agent, or Firm* — Kenealy Vaidya LLP

(57) ABSTRACT

Provided is a vehicle headlight for forming a high-beam additional light distribution pattern overlaid on a high-beam light distribution pattern. The vehicle headlight is capable of making a driver feel the sense of turning-on of the headlight when the high-beam additional light distribution pattern is additionally formed. The vehicle lighting fixture can be configured to further form a turning-on perceptible light distribution pattern for causing a driver to feel a sense of turning-on together with the high-beam additional light distribution pattern.

11 Claims, 11 Drawing Sheets

(51) Int. Cl.
*F21S 41/657* (2018.01)
*B60Q 1/18* (2006.01)
*B60Q 1/00* (2006.01)
*B60Q 1/12* (2006.01)
*B60Q 1/14* (2006.01)
*F21S 41/14* (2018.01)
*F21S 41/255* (2018.01)
*F21S 41/33* (2018.01)
*F21S 41/43* (2018.01)
*F21S 41/663* (2018.01)
*F21S 45/47* (2018.01)
*F21S 41/16* (2018.01)

(52) U.S. Cl.
CPC .............. *F21S 41/663* (2018.01); *F21S 45/47* (2018.01); *B60Q 2300/112* (2013.01); *B60Q 2300/122* (2013.01); *B60Q 2300/41* (2013.01); *B60Q 2300/42* (2013.01); *B60Q 2300/45* (2013.01)

(56) References Cited

U.S. PATENT DOCUMENTS

| | | | | |
|---|---|---|---|---|
| 2006/0171160 | A1* | 8/2006 | Meyrenaud | F21S 41/164 362/517 |
| 2006/0285347 | A1* | 12/2006 | Okada | F21S 41/143 362/516 |
| 2007/0086202 | A1* | 4/2007 | Tsukamoto | F21S 41/147 362/514 |
| 2007/0230204 | A1* | 10/2007 | Tatsukawa | F21S 48/1154 362/539 |
| 2008/0025036 | A1 | 1/2008 | Takada et al. | |
| 2008/0112180 | A1* | 5/2008 | Okada | F21S 41/155 362/518 |
| 2008/0225540 | A1* | 9/2008 | Tsukamoto | F21S 48/1159 362/514 |
| 2008/0239740 | A1* | 10/2008 | Nakada | F21S 48/1154 362/507 |
| 2009/0268480 | A1* | 10/2009 | Nishihata | F21S 41/336 362/516 |
| 2010/0027283 | A1* | 2/2010 | Kagiyama | F21S 48/1186 362/512 |
| 2011/0280029 | A1* | 11/2011 | Yamamoto | F21S 48/1159 362/516 |
| 2012/0008335 | A1* | 1/2012 | Yamamoto | F21S 48/1747 362/539 |
| 2012/0201040 | A1* | 8/2012 | Naganawa | F21S 48/1159 362/487 |
| 2012/0262935 | A1* | 10/2012 | Yamamoto | B60Q 1/14 362/516 |
| 2013/0188376 | A1 | 7/2013 | En et al. | |
| 2013/0188378 | A1* | 7/2013 | Yamamoto | F21V 13/04 362/512 |
| 2013/0201710 | A1* | 8/2013 | Suzuki | B60Q 1/04 362/512 |
| 2014/0112012 | A1 | 4/2014 | Nakazato et al. | |

FOREIGN PATENT DOCUMENTS

| | | | | |
|---|---|---|---|---|
| JP | 2013020781 A | * | 1/2013 | ............ F21S 41/147 |
| JP | 2013-152812 A | | 8/2013 | |

* cited by examiner

VEHICLE LIGHTING FIXTURE

This application claims the priority benefit under 35 U.S.C. § 119 of Japanese Patent Application No. 2015-059940 filed on Mar. 23, 2015, which is hereby incorporated in its entirety by reference.

TECHNICAL FIELD

The presently disclosed subject matter relates to vehicle lighting fixtures such as vehicle headlights, and in particular, to a vehicle headlight configured to form a high-beam additional light distribution pattern to be overlaid on a high-beam light distribution pattern.

BACKGROUND ART

In the technical field of vehicle headlights, there have been conventionally proposed vehicle headlights configured to form a high-beam additional light distribution pattern to be overlaid on a high-beam light distribution pattern, for example, those disclosed in Japanese Patent Application Laid-Open No. 2012-243727 (or US2014/0112012A1 corresponding thereto).

The vehicle headlight disclosed in this publication is configured to form a high-beam synthesis light distribution pattern, as illustrated in FIG. 1, including a hot zone and a diffusion zone in which the light is diffused more than that in the hot zone. Specifically, the vehicle headlight for forming the high-beam synthesis light distribution pattern is configured to include a first lighting unit and a second lighting unit. The first lighting unit can include a laser light source, and a first optical system configured to project light from the laser light source forward on the hot zone to form a first light distribution pattern $P2_{LD}$ (high-beam additional light distribution pattern). The second lighting unit can include an LED light source, and a second optical system configured to project light from the LED light source forward on the diffusion zone to form a second light distribution pattern $P2_{LED}$ (high-beam light distribution pattern).

The vehicle headlight disclosed in this publication can turn on only the second lighting unit during driving in an urban area while turning on the first lighting unit in addition to the turning-on of the second lighting unit during driving on a highway. In this case, the vehicle headlight can be configured in such a manner that the first light distribution pattern $P2_{LD}$ (high-beam additional light distribution pattern) can be overlaid on the second light distribution pattern $P2_{LED}$ (high-beam light distribution pattern). Although this configuration can improve the distant visibility during driving on a highway, the driver cannot feel the sense of turning-on of the headlight due to the farther side being brightened.

SUMMARY

The presently disclosed subject matter was devised in view of these and other problems and features in association with the conventional art. According to an aspect of the presently disclosed subject matter, a vehicle lighting fixture can be configured to be a vehicle headlight for forming a high-beam additional light distribution pattern overlaid on a high-beam light distribution pattern, and be capable of making a driver feel the sense of turning-on of the headlight when the high-beam additional light distribution pattern is additionally formed.

According to another aspect of the presently disclosed subject matter, a vehicle lighting fixture can be configured to form a high-beam light distribution pattern and a high-beam additional light distribution pattern to be overlaid on the high-beam light distribution pattern. The vehicle lighting fixture can be configured to further form a turning-on perceptible light distribution pattern for causing a driver to feel a sense of turning-on together with the high-beam additional light distribution pattern.

In the vehicle lighting fixture configured to form the high-beam additional light distribution pattern to be overlaid on the high-beam light distribution pattern with the above-mentioned configuration, when the high-beam additional light distribution pattern is additionally formed, a driver can be caused to feel the sense of turning-on because of the formation of the turning-on perceptible light distribution pattern together with the high-beam additional light distribution pattern.

In the vehicle lighting fixture with the above-mentioned configuration, the turning-on perceptible light distribution pattern may have a width narrower than that of the high-beam additional light distribution pattern. Also with this configuration, the above-mentioned advantageous effects can be achieved.

In the vehicle lighting fixture with the above-mentioned configuration, the turning-on perceptible light distribution pattern may be a streaky pattern. Also with this configuration, the above-mentioned advantageous effects can be achieved.

According to another aspect of the presently disclosed subject matter, the vehicle lighting fixture of the above-described aspect can be configured to include a lighting unit configured to simultaneously form the high-beam additional light distribution pattern and the turning-on perceptible light distribution pattern. Also with this configuration, the above-mentioned advantageous effects can be achieved.

According to another aspect of the presently disclosed subject matter, the vehicle lighting fixture of the above-described aspect can be configured to include a swivel mechanism configured to swivel the lighting unit in a left-right direction (horizontal direction) to move formation positions of the high-beam additional light distribution pattern and the turning-on perceptible light distribution pattern in the left-right direction.

The vehicle lighting fixture with this configuration can cause the swivel mechanism to move (swivel or rotate) the formation positions of the high-beam additional light distribution pattern and the turning-on perceptible light distribution pattern in the left-right direction, thereby achieving the guiding of the line of sight of a driver.

According to still another aspect of the presently disclosed subject matter, the vehicle lighting fixture of the above-described aspect can be configured such that the lighting unit can include: a projector lens having a rear-side focal point; a light source disposed behind the rear-side focal point of the projector lens and configured to emit light downward; a front-side reflecting surface and a rear-side reflecting surface both disposed below the light source; a rear-side shade configured to extend from a position at or near the rear-side focal point of the projector lens toward the light source; and a front-side shade configured to extend from a front end edge of the rear-side shade to the projector lens forward and obliquely upward. The rear-side reflecting surface can be configured to reflect the light from the light source and converge the same at or near the rear-side focal point of the projector lens so that the reflected and converged light can be projected forward through the projector lens to form the high-beam additional light distribution pattern. The front-side reflecting surface can be configured to reflect the light from the light source and converge the same in a region of the front-side shade at or near the rear-side focal point of the projector lens so that the reflected and converged light can be projected forward through the projector lens to form the turning-on perceptible light distribution pattern.

With this configuration, first, when the lighting unit is additionally turned on, the high-beam additional light distribution pattern can be formed to be overlaid on the high-beam light distribution pattern, thereby improving the distant visibility due to the extended irradiation distance. Second, when the lighting unit is additionally turned on, the turning-on perceptible light distribution pattern can be formed on a road surface in front of the vehicle body. This can significantly increase the illumination intensity on the road surface in front of the vehicle body, thereby causing a driver to feel a sense of turning-on (causing a driver to perceive the turning-on of the lighting unit for forming the high-beam additional light distribution pattern).

According to still another aspect of the presently disclosed subject matter, the vehicle lighting fixture of the above-described aspect can be configured such that the rear-side reflecting surface can be configured to be an ellipsoidal reflecting surface having a first focal point set at or near the light source and a second focal point set at or near the rear-side focal point of the projector lens, and the front-side reflecting surface can be configured to be an ellipsoidal reflecting surface having a first focal point set at or near the light source and a second focal point set above and forward of the rear-side focal point of the projector lens. With this configuration, the above-mentioned advantageous effects can be achieved.

In the vehicle lighting fixture with the above-mentioned configuration, the projector lens can include a vertically diffusing portion configured to vertically diffuse light that is directed to or near a lower end edge of the high-beam additional light distribution pattern. This configuration can form the high-beam additional light distribution pattern with the lower end edge thereof being blurred. As a result, the effect of chromatic aberration generated at or near the lower end edge of the high-beam additional light distribution pattern can be suppressed. In addition, the illumination intensity between the high-beam additional light distribution pattern and the turning-on perceptible light distribution pattern can be gradually varied, thereby improving the sense of light distribution.

The vehicle lighting fixture with the above-mentioned configuration can control the high-beam additional light distribution pattern and the turning-on perceptible light distribution pattern to be formed when a vehicle speed of the vehicle body on which the vehicle lighting fixture is installed reaches a predetermined vehicle speed or higher. Accordingly, the vehicle lighting fixture during driving at higher speed can advantageously form both the high-beam additional light distribution pattern and the turning-on perceptible light distribution pattern.

The vehicle lighting fixture can be used as a vehicle headlight.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lights of the presently disclosed subject matter with reference to the accompanying drawings in accordance with exemplary embodiments.

Figure 1:
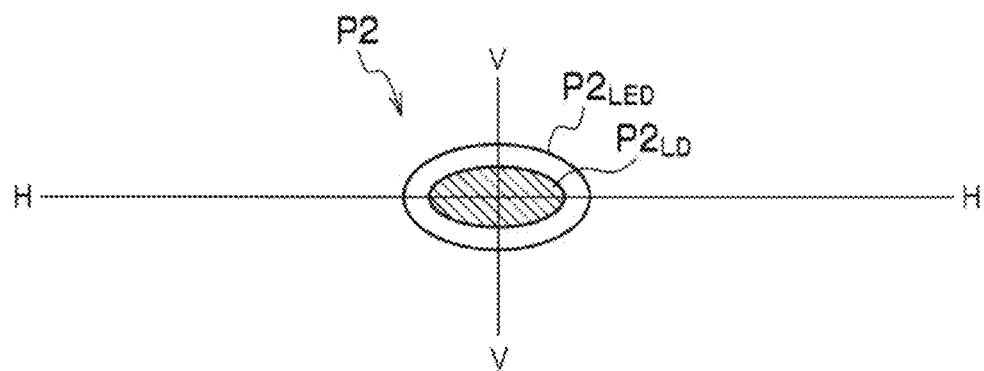
FIG. 1 shows an exemplary high-beam synthetic light distribution pattern formed by the conventional vehicle headlight described in Japanese Patent Application Laid-Open No. 2012-243727.
Figure 2:
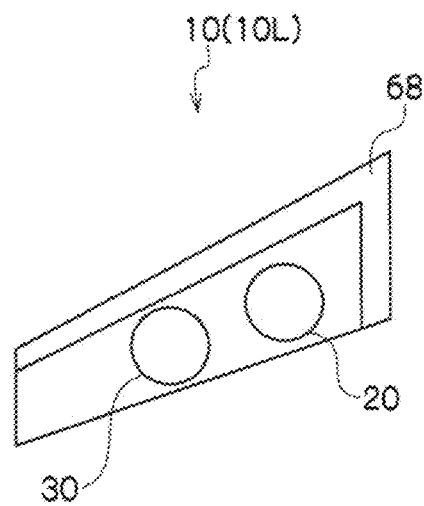
FIG. 2 is a schematic view of a vehicle lighting fixture as a vehicle headlight 10L made in accordance with principles of the presently disclosed subject matter, to be disposed on a left front portion of a vehicle body (not shown)
Figure 3:
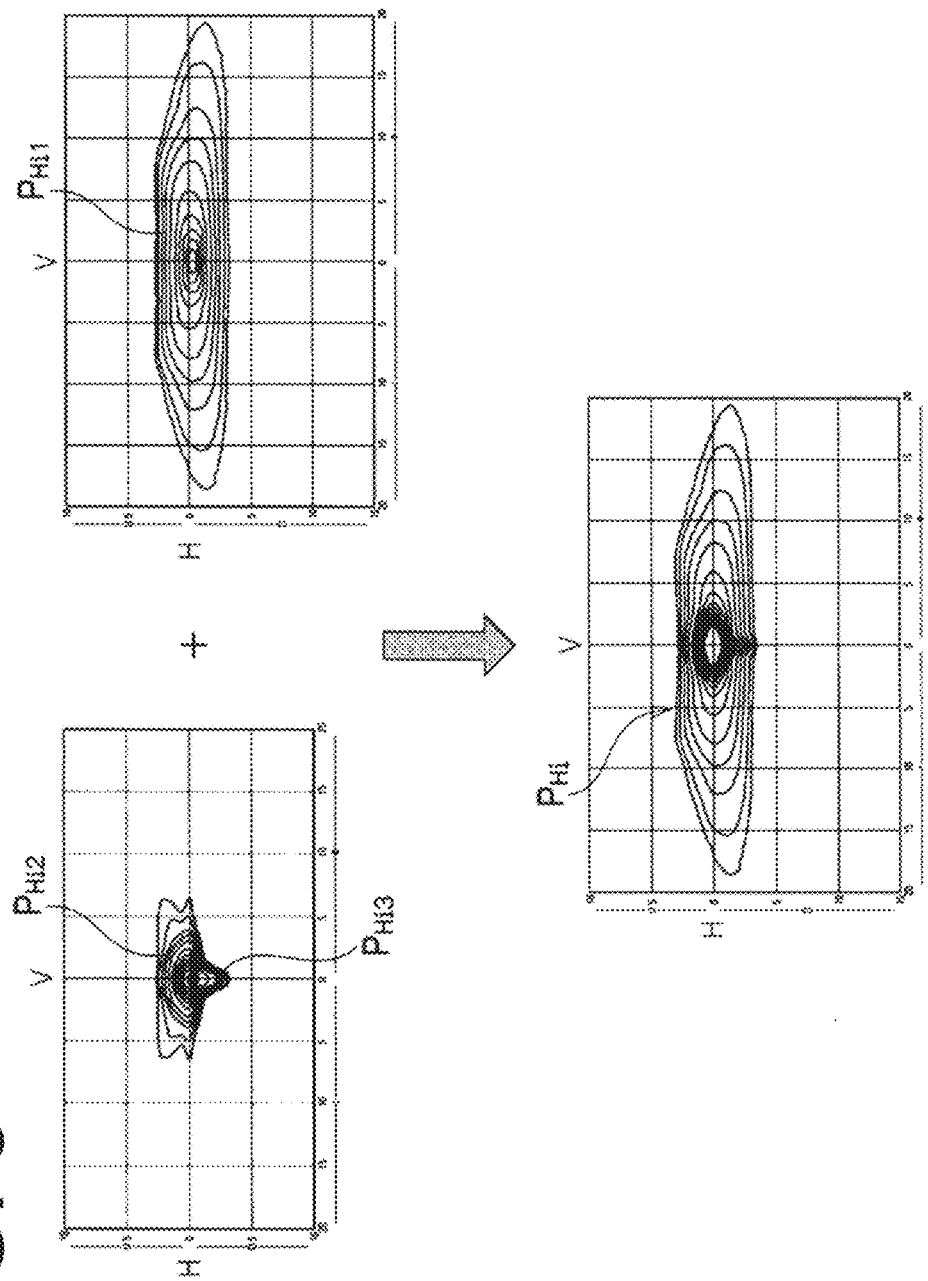
FIG. 3 shows an example of a high-beam synthetic light distribution pattern $P_{Hi}$ formed on a virtual vertical screen (assumed to be disposed in front of the vehicle body approximately 25 m away from the vehicle body) with light projected forward from the vehicle headlight 10L.

FIG. 2 is a schematic view of the vehicle lighting fixture as the vehicle headlight 10L made in accordance with the principles of the presently disclosed subject matter, to be disposed on a left front portion of a vehicle body (not shown). FIG. 3 shows an example of a high-beam synthetic light distribution pattern $P_{Hi}$ formed on a virtual vertical screen (assumed to be disposed in front of the vehicle body approximately 25 m away from the vehicle body) with light projected forward from the vehicle headlight 10L.

The vehicle headlight 10 of this exemplary embodiment can include a pair of a vehicle headlight 10L, as illustrated in FIG. 2, to be disposed on the left front portion of the vehicle body and a not-illustrated vehicle headlight to be disposed on a right front portion of the vehicle body. The vehicle headlight to be disposed on the right side can basically have the same configuration as the vehicle headlight 10L to be disposed on the left side in a bilaterally symmetric manner. Thus, a description for the vehicle headlight 10L to be disposed on the left side will mainly be described while a description for the vehicle headlight to be disposed on the right side will be omitted hereinafter.

The vehicle headlight 10L can include a lighting unit 20, an additional lighting unit 30, and a signal lighting unit 68, for example.

The lighting unit 20 can be configured to form a low-beam light distribution pattern or a high-beam light distribution pattern $P_{Hi1}$ as illustrated in FIG. 3. A known lighting unit for projecting low-beam light and/or high-beam light can be adopted as the lighting unit 20.

The additional lighting unit 30 can be configured to form the high-beam additional light distribution pattern $P_{Hi2}$ (see FIG. 3) and the turning-on perceptible light distribution pattern $P_{Hi3}$ (see FIG. 3), to be overlaid on the high-beam light distribution pattern $P_{Hi1}$, on the road surface in front of the vehicle body.

Figure 4A:
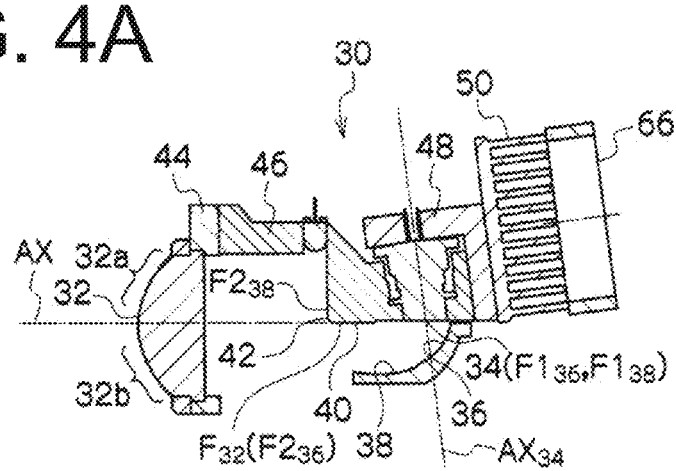
FIG. 4A is a vertical cross-sectional view of an additional lighting unit 30 and FIG. 4B is an optical path diagram showing light paths along which light emitted from a light source 34 passes.
Figure 4B:
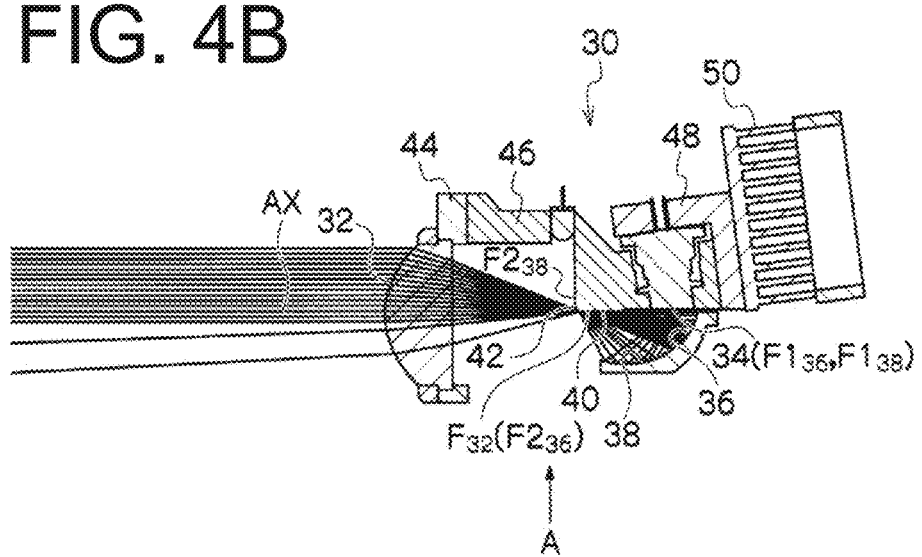
Figure 5:
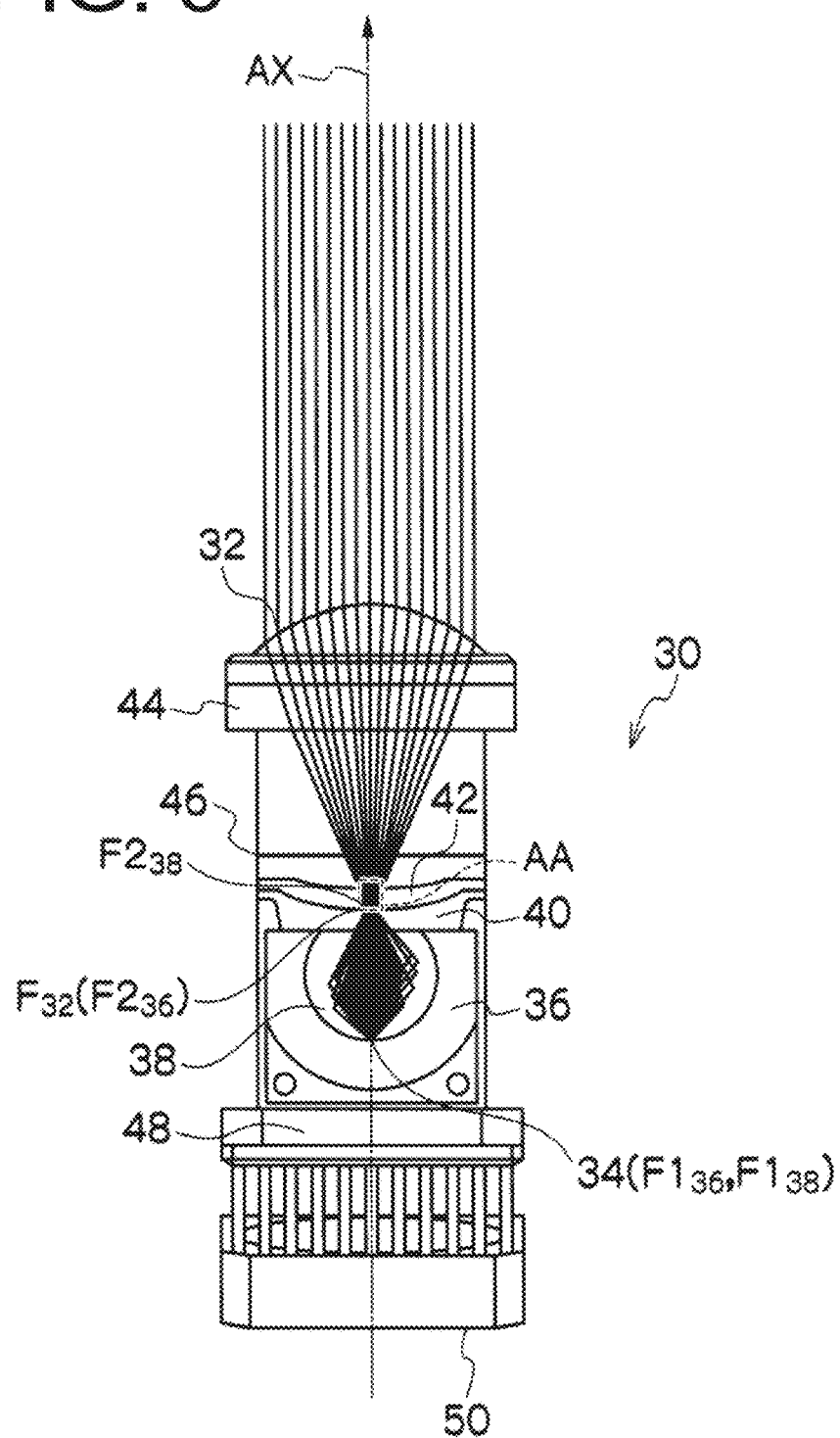
FIG. 5 is a diagram of the additional lighting unit 30 when seen from a direction indicated by arrow A in FIG. 4B.

FIG. 4A is a vertical cross-sectional view of the additional lighting unit 30 and FIG. 4B is an optical path diagram showing light paths along which light emitted from a light source 34 passes, and FIG. 5 is a diagram of the additional lighting unit 30 when seen from a direction indicated by the arrow A in FIG. 4B.

As shown in FIGS. 4A, 4B, and 5, the additional lighting unit 30 can include: a projector lens 32 having a rear-side focal point $F_{32}$; a light source 34 disposed behind the rear-side focal point $F_{32}$ of the projector lens 32 and configured to emit light downward; a front-side reflecting surface 38 and a rear-side reflecting surface 36 both disposed below the light source 34; a rear-side shade 40 configured to extend from a position at or near the rear-side focal point $F_{32}$ of the projector lens 32 toward the light source 34; and a front-side shade 42 configured to extend from a front end edge of the rear-side shade 40 to the projector lens 32 forward and obliquely upward.

The projector lens 32 can be a plano-convex lens having a convex lens surface on the front surface side and a flat surface on the rear surface side. The vehicle headlight 10L can have a reference axis AX or an optical axis extending in a front-rear direction of the vehicle body. The projector lens 32 can be disposed on the reference axis AX while being held by a lens holder 44. The rear-side focal point $F_{32}$ of the projector lens 32 can be located at or near an intersection between the reference axis AX and a border line between the rear-side shade 40 and the front-side shade 42. The projector lens 32 can include vertically diffusing portions 32a and 32b configured to vertically diffuse light that is directed to or near a lower end edge of the high-beam additional light distribution pattern $P_{Hi2}$. The vertically diffusing portions 32a and 32b can be formed in regions of the projector lens 32 through which the light to be directed to the lower end edge of the high-beam additional light distribution pattern $P_{Hi2}$ is projected, specifically, in an upper end-side region and a lower end-side region of the front surface of the projector lens 32. These regions can be suitably determined in consideration of how chromatic aberration is generated at or near the lower end edge of the high-beam additional light distribution pattern $P_{Hi2}$ (cut-off line). The function of the vertically diffusing portions 32a and 32b can be imparted by subjecting the upper end-side region and lower end-side region of the front surface (aspheric surface) of the projector lens 23 to processing to form a curved surface (impart a radius of curvature R thereto) or flat surface.

In the present exemplary embodiment, the projector lens 32 can be sized to have a diameter of 30 mm and a back-focus value of 28 mm.

The light source 34 can be disposed behind the rear-side focal point $F_{32}$ of the projector lens 32 and at or near the reference axis AX while being held by a holding member (composed of a first holding member 46 and a second holding member 48 fixed to the first holding member 46) so that the light source 34 can emit light downward. The light source 34 can be a well-known wavelength converting member configured to be used in combination with a semiconductor laser element and to serve as a white light source configured to emit light when being irradiated with laser light from the semiconductor laser element. Examples thereof may include those disclosed in Japanese Patent Application Laid-Open No. 2013-152812. The light source (wavelength converting member) 34 can have a rectangular shape with dimensions of 0.4 mm in the front-rear direction and 0.8 mm in the vehicle width direction. Other examples of the light source 34 may include an incandescent bulb, a halogen bulb, an HID bulb, and a white light source configured to include a semiconductor light emitting element other than a semiconductor laser element (such as an LED element) and a wavelength converting member capable of emitting light by light from the semiconductor light emitting element.

A heat dissipation member 50 can be attached to the second holding member 48, so that heat generated by the light source 34 can be dissipated by the heat dissipation member 50 via the second holding member 48. In order to facilitate the heat dissipation, a fan 66 can be attached to the heat dissipation member 50, thereby effectively dissipating the generated heat.

The rear-side reflecting surface 36 can be configured to reflect the light from the light source 34 and converge the same at or near the rear-side focal point $F_{32}$ of the projector lens 32 so that the reflected and converged light can be projected forward through the projector lens 32 to form the high-beam additional light distribution pattern $P_{Hi2}$.

For example, the rear-side reflecting surface 36 can be configured to be an ellipsoidal reflecting surface (ellipsoid of revolution or a free curved surface similar thereto) having a first focal point $F1_{36}$ set at or near the light source 34 and a second focal point $F2_{36}$ set at or near the rear-side focal point $F_{32}$ of the projector lens 32. The rear-side reflecting surface 36 of the ellipsoidal reflecting surface can cover the area ranging from a sideward position to a downward position with respect to the light source 34 in a dome shape except for a front area where the light reflected by the rear-side reflecting surface 36 passes. The rear-side reflecting surface 36 can be fixed at its peripheral upper edge by the second holding member 48. The rear-side reflecting surface 36 can be sized in consideration of the focal distance and size (NA) of the projector lens 32, and, for example, be ranged in an angular range of 00 to 108° with respect to an optical axis $AX_{34}$ of the light source 34.

The front-side reflecting surface 38 can be configured to reflect the light from the light source 34 and converge the same in a region AA of the front-side shade 42 at or near the rear-side focal point $F_{32}$ of the projector lens 32 so that the reflected and converged light can be projected forward through the projector lens 32 to form the turning-on perceptible light distribution pattern $P_{Hi3}$.

The front-side reflecting surface 38 can be configured to be an ellipsoidal reflecting surface (ellipsoid of revolution or a free curved surface similar thereto) having a first focal point $F1_{38}$ set at or near the light source 34 and a second focal point $F2_{38}$ set at or near the rear-side focal point $F_{32}$ of the projector lens 32. The front-side reflecting surface 38 can extend from the front end edge of the rear-side reflecting surface 36 toward the projector lens 32 so as not to shield the light reflected from the rear-side reflecting surface 36. The front-side reflecting surface 38 can be sized in consideration of the focal distance and size (NA) of the projector lens 32, and, for example, be ranged in an angular range of 108° to 154° with respect to the optical axis $AX_{34}$ of the light source 34.

The rear-side shade 40 can be provided to the first holding member 46 and configured by a mirror surface extending from a position near the rear-side focal point $F_{32}$ of the projector lens 32 toward the light source 34.

The front-side shade 42 can be connected to the rear-side shade 40. The front-side shade 42 can be provided to the first holding member 46 and configured by a mirror surface extending from the front end edge of the rear-side shade 40 toward the projector lens 32 forward and obliquely upward.

A description will now be given of the high-beam additional light distribution pattern $P_{Hi2}$ and the turning-on perceptible light distribution pattern $P_{Hi3}$.

Figure 6A:
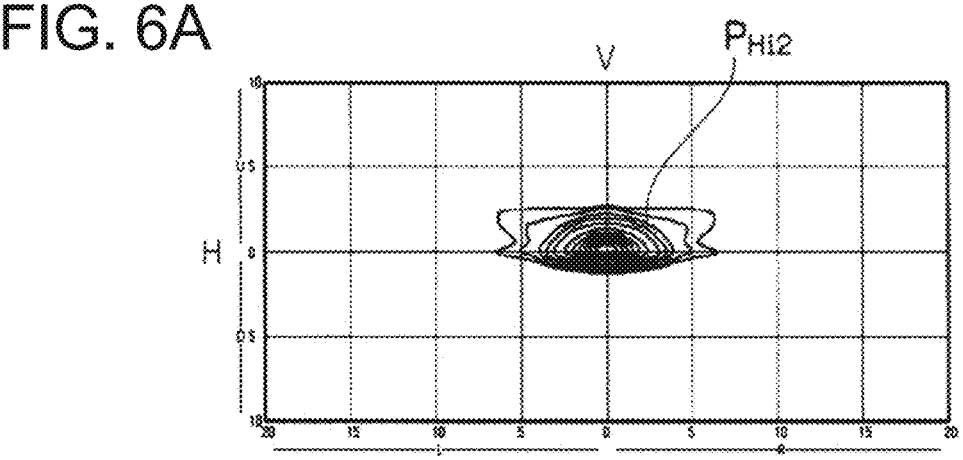
FIG. 6A is a diagram of an example of a high-beam additional light distribution pattern $P_{Hi2}$.
Figure 6B:
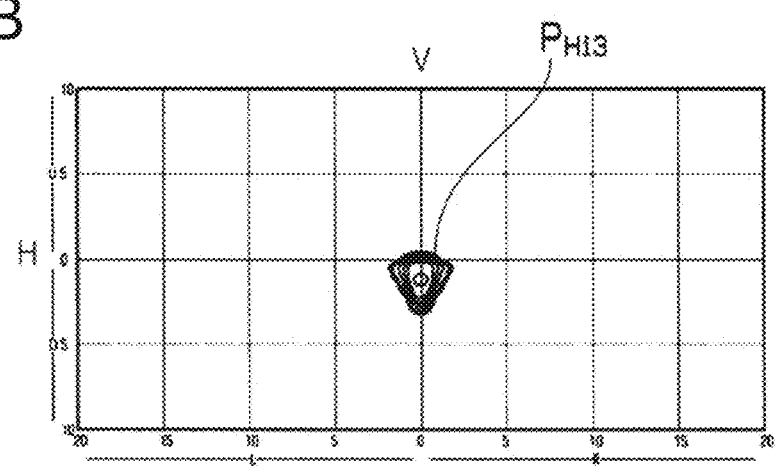
FIG. 6B is a diagram of an example of a turning-on perceptible light distribution pattern $P_{Hi3}$.
Figure 6C:
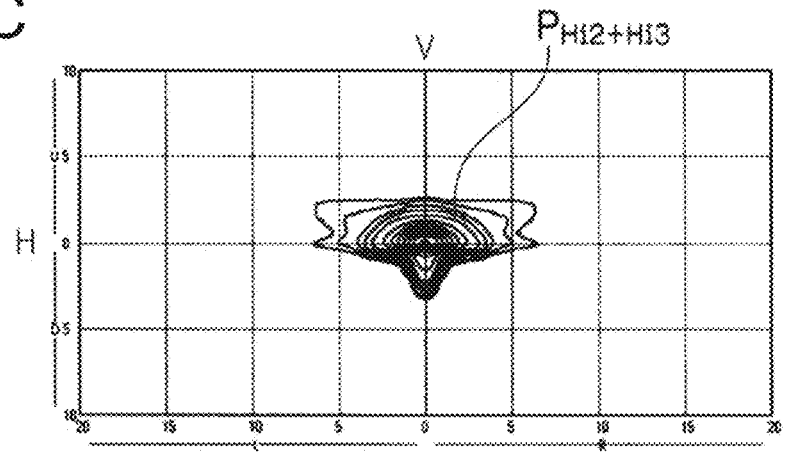
FIG. 6C is a diagram of an example of a synthesis light distribution pattern $P_{Hi2+Hi3}$ produced by overlaying the high-beam additional light distribution pattern $P_{Hi2}$ and the turning-on perceptible light distribution pattern $P_{Hi3}$ on each other.

FIG. 6A is a diagram of an example of the high-beam additional light distribution pattern $P_{Hi2}$, FIG. 6B is a diagram of an example of the turning-on perceptible light distribution pattern $P_{Hi3}$, and FIG. 6C is a diagram of an example of a synthesis light distribution pattern $P_{Hi2+Hi3}$ produced by overlaying the high-beam additional light distribution pattern $P_{Hi2}$ and the turning-on perceptible light distribution pattern $P_{Hi3}$ on each other.

First, the light can be emitted from the light source 34 and incident on the rear-side reflecting surface 36. The incident light can be reflected by the rear-side reflecting surface 36 and then directed to the rear-side shade 40. Then, part of the light not shielded by the rear-side shade 40 and part of the light reflected by the rear-side shade 40 can be projected by the projector lens 32 forward to form the high-beam additional light distribution pattern $P_{Hi2}$ having a cut-off line at its lower end edge defined by the front end edge of the rear-side shade 40. In this case, the light reflected by the rear-side shade 40 can be vertically reversed with the part at the front end edge of the rear-side shade 40 as a border so that the light can be overlaid on an area above the cut-off line. In this manner, any light directed to the front area nearer the vehicle body can be eliminated while the maximum light intensity of the high-beam additional light distribution pattern $P_{Hi2}$ can be increased.

The high-beam additional light distribution pattern $P_{Hi2}$, as illustrated in FIGS. 3 and 6A, can have a smaller size than the high-beam light distribution pattern $P_{Hi1}$ formed by the lighting unit 20 and be overlaid on the substantial center area of the high-beam light distribution pattern $P_{Hi1}$ (near the intersection of the horizontal reference line H and the vertical reference line V). This means that the area near the intersection of the horizontal reference line H and the vertical reference line V can be irradiated with higher intensity light, thereby improving the distant visibility.

On the other hand, the light emitted from the light source 34 can be incident on the front-side reflecting surface 38. The incident light can be reflected by the front-side reflecting surface 38 and then directed to the front-side shade 42. Then, part of the light not shielded by the front-side shade 42 and part of the light reflected by the front-side shade 42 can be projected by the projector lens 32 forward to form the turning-on perceptible light distribution pattern $P_{Hi3}$. Furthermore, part of light reflected by the front-side reflecting surface 38 can be converged at or near the border between the rear-side shade 40 and the front-side shade 42 and incident on the region AA (having a substantially rectangular shape) of the front-side shade 42 (see FIG. 5).

The turning-on perceptible light distribution pattern $P_{Hi3}$, as illustrated in FIGS. 3 and 6B, can have a narrower size than the high-beam additional light distribution pattern $P_{Hi2}$, and be formed as a streak pattern below the high-beam additional light distribution pattern $P_{Hi2}$ on the road surface in front of the vehicle body while extending in the front-rear direction of the vehicle body (see FIG. 7F).

The turning-on perceptible light distribution pattern $P_{Hi3}$ can have a narrower width (lateral width) in the horizontal direction than the high-beam additional light distribution pattern $P_{Hi2}$, and the reason thereof is as follows.

Specifically, since the front-side reflecting surface 38 is disposed on the farther side from the light source 34 than the rear-side reflecting surface 36, the light source image of the light source 34 formed by the light reflected by the front-side reflecting surface 38 is relatively smaller than the light source image of the light source 34 formed by the light reflected by the rear-side reflecting surface 36 and this relatively smaller light source image contributes to the formation of the turning-on perceptible light distribution pattern $P_{Hi3}$. Conversely, since the rear-side reflecting surface 36 is disposed on the nearer side from the light source 34 than the front-side reflecting surface 38, the light source image of the light source 34 formed by the light reflected by the rear-side reflecting surface 36 is relatively larger than the light source image of the light source 34 formed by the light reflected by the front-side reflecting surface 38 and this relatively larger light source image contributes to the formation of the high-beam additional light distribution pattern $P_{Hi2}$. As a result, the turning-on perceptible light distribution pattern $P_{Hi3}$ can have a narrower width than the high-beam additional light distribution pattern $P_{Hi2}$.

As described above, since the width of the turning-on perceptible light distribution pattern $P_{Hi3}$ can be narrowed along the horizontal reference line H, the turning-on perceptible light distribution pattern $P_{Hi3}$ can be increased in illumination intensity as compared with a case where the width of the turning-on perceptible light distribution pattern $P_{Hi3}$ is not narrowed along the horizontal reference line H (for example, the width of the turning-on perceptible light distribution pattern $P_{Hi3}$ is substantially the same as that of the high-beam additional light distribution pattern $P_{Hi2}$) provided that the basic light intensity (luminous flux) is the same. This configuration can cause a driver to feel the sense of turning-on more strongly.

Here, the turning-on perceptible light distribution pattern $P_{Hi3}$ can be widened in width (longitudinal width) along the vertical reference line V. This is because the second focal point $F2_{38}$ of the front-side reflecting surface 38 is disposed above the rear-side focal point $F_{32}$ of the projector lens 32.

The lateral width and longitudinal width of the turning-on perceptible light distribution pattern $P_{Hi3}$ (streaky pattern) can be adjusted by adjusting the position of the second focal point $F2_{38}$ of the front-side reflecting surface 38. Further, the longitudinal width of the turning-on perceptible light distribution pattern $P_{Hi3}$ can be adjusted by adjusting the length of the front-side shade 42.

With the above-described configuration, the turning-on perceptible light distribution pattern $P_{Hi3}$ can be formed together with the high-beam additional light distribution pattern $P_{Hi2}$ on the road surface in front of the vehicle body, thereby causing a driver to feel a sense of turning-on. Specifically, the vehicle lighting fixture with the above-described configuration can cause the driver to feel a sense of turning on of the additional lighting unit 30 (a sense of forming the high-beam additional light distribution pattern $P_{Hi2}$). Herein, the area on the road surface in front of the vehicle body where to form the turning-on perceptible light distribution pattern $P_{Hi3}$ is not limited to a particular area as long as the area can be visually observed by a driver sitting in a driving seat. Example of the area on the road surface in front of the vehicle body where to form the turning-on perceptible light distribution pattern $P_{Hi3}$ include an area approximately 80 meters away from the front end of the vehicle body. In this case, the turning-on perceptible light distribution pattern $P_{Hi3}$ may be contained within the area or part thereof (the front end part thereof) may be situated outside this area. This means that the turning-on perceptible light distribution pattern $P_{Hi3}$ should be formed in part or entirely in an area that can be visually recognized easily by a driver sitting in a driving seat.

A description will next be given of the advantageous effects.

Figure 7:
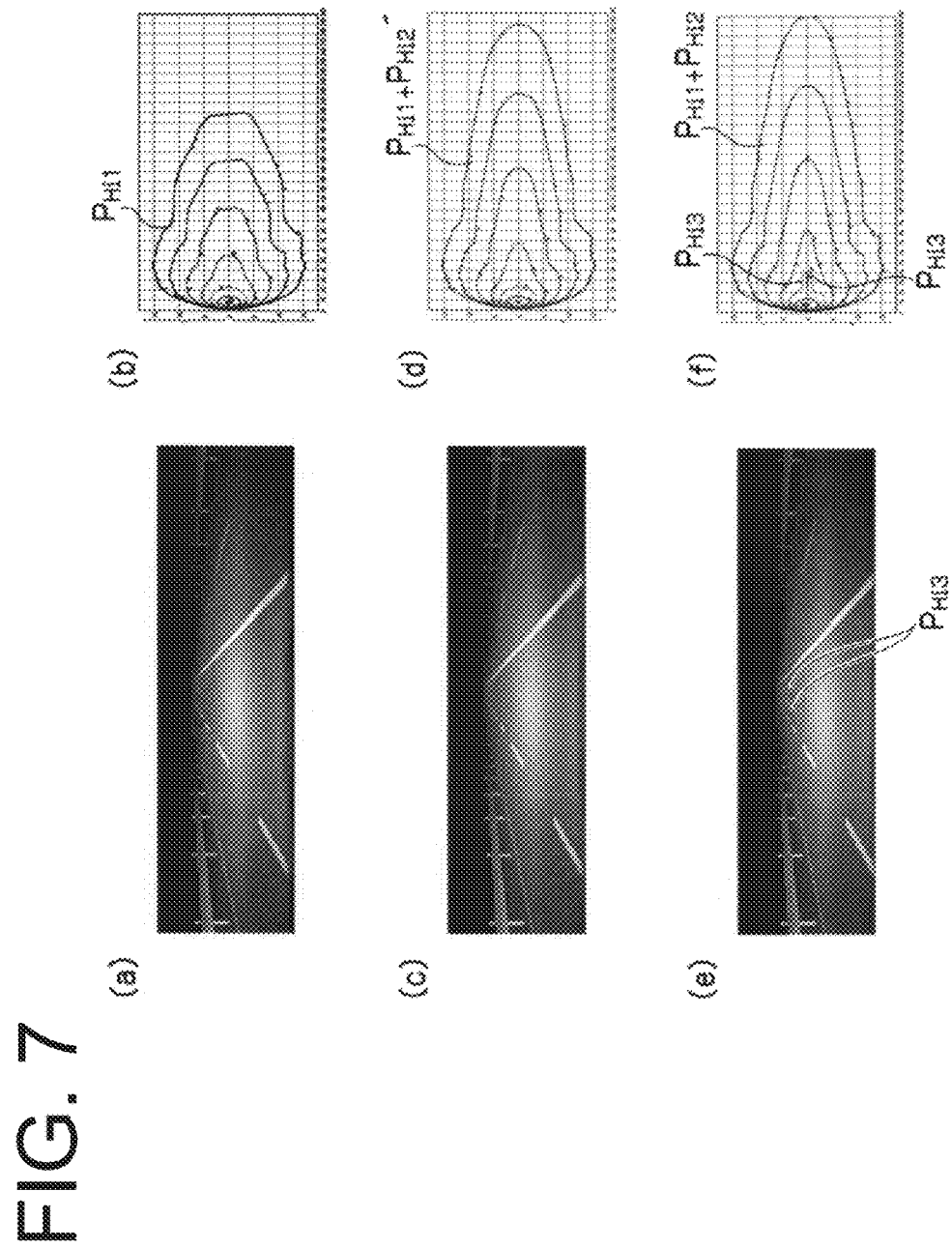
FIG. 7 shows photographs showing a road surface irradiated with light from the vehicle headlight and diagrams showing illumination intensity distributions wherein (a) is a photograph showing a state where a lighting unit 20 forms a high-beam light distribution pattern $P_{Hi1}$ on a road surface to be irradiated with the patterned light, and (b) is a diagram showing the light distribution on the road surface (illumination intensity distribution) of (a); (c) is a photograph showing a state where the additional lighting unit 30 (without using a front-side reflecting surface 38 and a front-side shade 42) forms a high-beam additional light distribution pattern $P_{Hi2}'$ overlaid on the high-beam light distribution pattern $P_{Hi1}$ formed by the lighting unit 20 on the road surface to be irradiated with the patterned light, and (d) is a diagram showing the light distribution on the road surface (illumination intensity distribution) of (c); and (e) is a photograph showing a state where the additional lighting unit 30 forms the high-beam additional light distribution pattern $P_{Hi2}$ and the turning-on perceptible light distribution pattern $P_{Hi3}$ overlaid on the high-beam light distribution pattern $P_{Hi1}$ formed by the lighting unit 20 on the road surface to be irradiated with the patterned light, and (f) is a diagram showing the light distribution on the road surface (illumination intensity distribution) of (e)

The (a) of FIG. 7 is a photograph showing a road surface irradiated with light of the high-beam light distribution pattern $P_{Hi1}$ from the lighting unit 20 and the (b) of FIG. 7 is a diagram showing the illumination intensity distribution or light distribution on the road surface of the (a). Here, the light source of the lighting unit 20 is an LED.

The (c) of FIG. 7 is a photograph showing a state where the additional lighting unit 30 (without using a front-side reflecting surface 38 and a front-side shade 42) forms a high-beam additional light distribution pattern $P_{Hi2}'$ overlaid on the high-beam light distribution pattern $P_{Hi1}$ formed by the lighting unit 20 on the road surface to be irradiated with the patterned light, and the (d) is a diagram showing the light distribution on the road surface (illumination intensity distribution) of the (c).

When referring to the (c) and (d) of FIG. 7, the following matters can be confirmed.

First, the use of the additional lighting unit 30 (without using a front-side reflecting surface 38 and a front-side shade 42) to form the high-beam additional light distribution pattern $P_{Hi2}'$ overlaid on the high-beam light distribution pattern $P_{Hi1}$ formed by the lighting unit 20 can improve the distance visibility due to the elongated irradiation distance when compared with the case of the (b) of FIG. 7. Second, since the use of the additional lighting unit 30 (without using a front-side reflecting surface 38 and a front-side shade 42) cannot change the light intensity near the front of the vehicle body, meaning that it cannot cause a driver to sense a feeling of turning-on.

The (e) of FIG. 7 is a photograph showing a state where the additional lighting unit 30 forms the high-beam additional light distribution pattern $P_{Hi2}$ and the turning-on perceptible light distribution pattern $P_{Hi3}$ overlaid on the high-beam light distribution pattern $P_{Hi1}$ formed by the lighting unit 20 on the road surface to be irradiated with the patterned light, and the (f) is a diagram showing the light distribution on the road surface (illumination intensity distribution) of the (e).

When referring to the (e) and (f) of FIG. 7, the following matters can be confirmed.

First, the use of the additional lighting unit 30 to form the high-beam additional light distribution pattern $P_{Hi2}$ overlaid on the high-beam light distribution pattern $P_{Hi1}$ formed by the lighting unit 20 can improve the distance visibility due to the elongated irradiation distance when compared with the case of the (b) of FIG. 7. Second, since the use of the additional lighting unit 30 can form the turning-on perceptible light distribution pattern $P_{Hi3}$ on the road surface near the front of the vehicle body, meaning that it can increase the illumination intensity on the road surface near the front of the vehicle body and surely cause a driver to sense a feeling of turning-on.

Note that the (f) of FIG. 7 shows two turning-on perceptible light distribution patterns $P_{Hi3}$ one of which is formed by the vehicle headlight 10L disposed on the left front portion of the vehicle body and the other of which is formed by the vehicle headlight disposed on the right front portion of the vehicle body.

As described above, the formation of the turning-on perceptible light distribution pattern $P_{Hi3}$ together with the high-beam additional light distribution pattern $P_{Hi2}$ overlaid thereon on the road surface in the front of the vehicle body can cause a driver to surely feel the sense of turning-on.

The lighting unit 20 and the additional lighting unit 30 can be moved in the left-right direction by a swivel mechanism.

The swivel mechanism can be configured to swivel the lighting unit 20 and the additional lighting unit 30 in the left-right direction (horizontal direction). In the illustrated exemplary embodiment in FIG. 9, the swivel mechanism can be an actuator 62 to be connected to the lighting unit 20 and the additional lighting unit 30 to move the lighting unit 20 and the additional lighting unit 30 in the left-right direction about a vertical axis. The swivel mechanism can be those disclosed in Japanese Patent Application Laid-Open No. 2008-034279 (or US2008/025036A1 corresponding thereto), for example.

Specifically, the actuator 62 serving as the swivel mechanism can move the lighting unit 20 and the additional lighting unit 30 in the left-right direction to thereby move (rotate) the formation positions of the high-beam light distribution pattern $P_{Hi1}$, the high-beam additional light distribution pattern $P_{Hi2}$, and the turning-on perceptible light distribution pattern $P_{Hi3}$ (in particular, the turning-on perceptible light distribution pattern $P_{Hi3}$) in the left-right direction, thereby achieving the guiding of the line of sight of a driver.

A description of the advantageous effects will further be described in detail.

Figure 8:
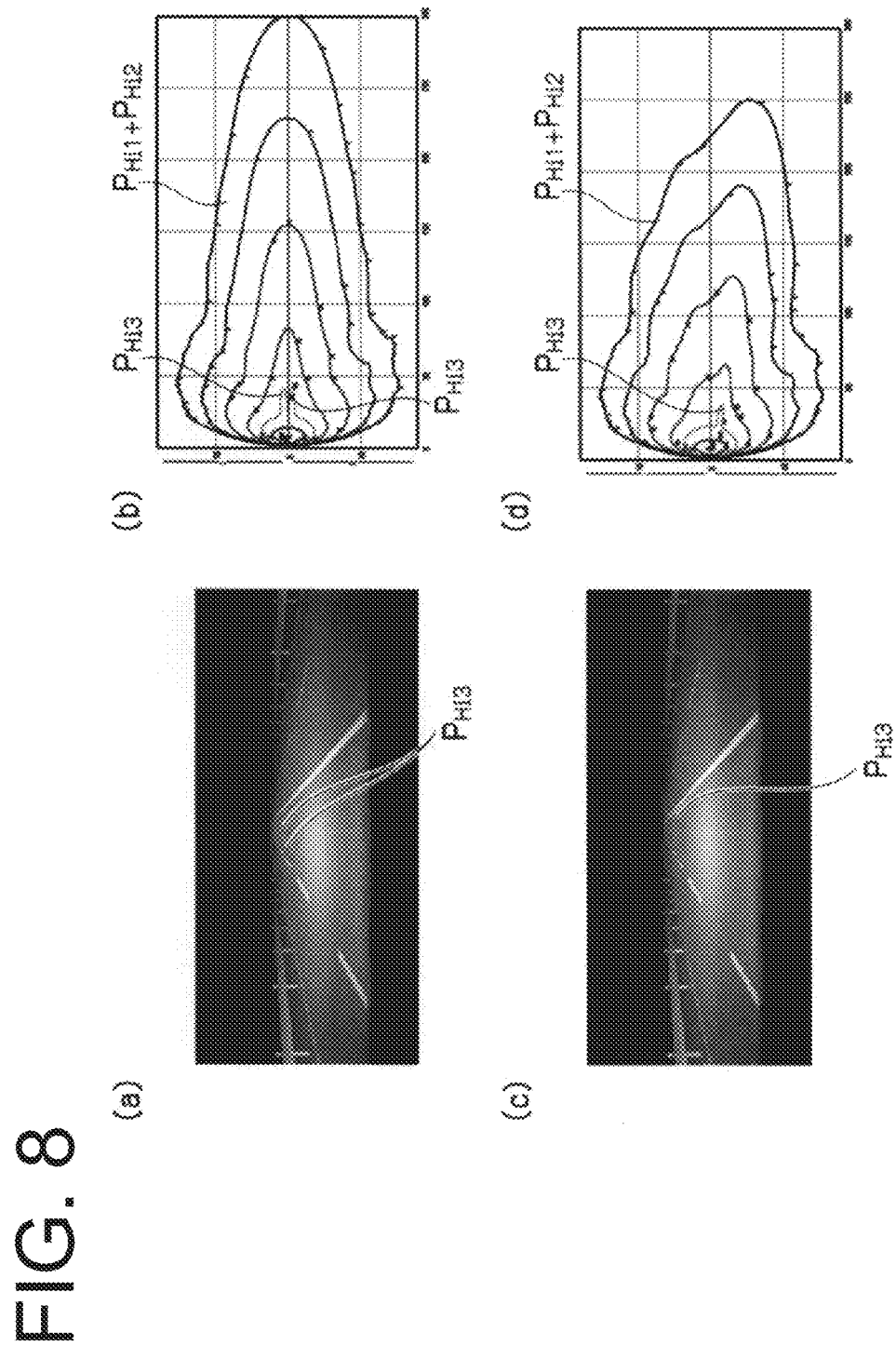
FIG. 8 shows photographs showing a road surface irradiated with light from the vehicle headlight and diagrams showing illumination intensity distributions wherein (a) is a photograph showing a state where the additional lighting unit 30 that is not swiveled in the horizontal direction forms the high-beam additional light distribution pattern $P_{Hi2}$ and the turning-on perceptible light distribution pattern $P_{Hi3}$ overlaid on the high-beam light distribution pattern $P_{Hi1}$ formed by the lighting unit 20 that is also not swiveled in the horizontal direction on the road surface to be irradiated with the patterned light, and (b) is a diagram showing the light distribution on the road surface (illumination intensity distribution) of (a); and (c) is a photograph showing a state where the additional lighting unit 30 that is swiveled rightward forms the high-beam additional light distribution pattern $P_{Hi2}$ and the turning-on perceptible light distribution pattern $P_{Hi3}$ overlaid on the high-beam light distribution pattern $P_{Hi1}$ formed by the lighting unit 20 that is also swiveled rightward on the road surface to be irradiated with the patterned light, and (d) is a diagram showing the light distribution on the road surface (illumination intensity distribution) of (c)

The (a) of FIG. 8 is a photograph showing a state where the additional lighting unit 30 that is not swiveled in the horizontal direction forms the high-beam additional light distribution pattern $P_{Hi2}$ and the turning-on perceptible light distribution pattern $P_{Hi3}$ overlaid on the high-beam light distribution pattern $P_{Hi1}$ formed by the lighting unit 20 that is also not swiveled in the horizontal direction on the road surface to be irradiated with the patterned light, and the (b) of FIG. 8 is a diagram showing the light distribution on the road surface (illumination intensity distribution) of the (a).

With reference to the (a) and (b) of FIG. 8, when a vehicle body of an automobile travels straightforward, it can be seen that the turning-on perceptible light distribution pattern $P_{Hi3}$ (streaky pattern) can be formed while extending in the front-rear direction of the vehicle body (i.e., in a traveling direction).

The (c) of FIG. 8 is a photograph showing a state where the additional lighting unit 30 that is swiveled rightward by a predetermined angle (for example, 7 degrees) forms the high-beam additional light distribution pattern $P_{Hi2}$ and the turning-on perceptible light distribution pattern $P_{Hi3}$ overlaid on the high-beam light distribution pattern $P_{Hi1}$ formed by the lighting unit 20 that is also swiveled rightward by the predetermined angle (for example, 7 degrees) on the road surface to be irradiated with the patterned light, and the (d) of FIG. 8 is a diagram showing the light distribution on the road surface (illumination intensity distribution) of the (c).

When referring to the (c) and (d) of FIG. 8, the following matters can be confirmed.

First, when the vehicle body is turning while travelling (lane change, turning right, or the like), and the additional lighting unit 30 is swivel rightward by a predetermined angle, the area where the turning-on perceptible light distribution pattern $P_{Hi3}$ is formed is shifted rightward (rotated or swiveled) so that the turning-on perceptible light distribution pattern $P_{Hi3}$ (streaky pattern) extends in the swivel direction. Second, the turning-on perceptible light distribution pattern $P_{Hi3}$ formed to extend in the swivel direction can guide the line of sight of a driver in the swivel direction, meaning that the driver's line of sight can be guided to a corner. Third, the area in the swivel direction can be irradiated with the light of the high-beam additional light distribution pattern $P_{Hi2}$ to improve the visibility in the swivel direction.

Note that the (c) and (d) of FIG. 8 shows a single turning-on perceptible light distribution pattern $P_{Hi3}$ which is formed by the vehicle headlight disposed on the right front portion of the vehicle body. In this manner, only the additional lighting unit 30 disposed near the swivel direction (in this case, the additional lighting unit 30 disposed on the right front portion of the vehicle body) when travelling while being turned (lane change, turning right, or the like) is turned on while being rotated. This configuration can reduce the movable range of the additional lighting unit 30. Furthermore, since only the additional lighting unit 30 is additionally turned on during high-speed driving, the swivel angle can be reduced. This configuration can also reduce the movable range of the additional lighting unit 30. As a result, the area where to install the additional lighting unit 30 can be reduced, leading to the miniaturization of the entire vehicle headlight 10. Of course, both the additional lighting units 30 disposed on respective left and right front sides of the vehicle body can be simultaneously turned on while being swiveled in the same direction.

The signal lighting unit 68 can be a positioning lamp, a DRL lamp, or the like.

A description will now be given of a system configuration configured to control the vehicle headlight 10 with the above-described configuration.

Figure 9:
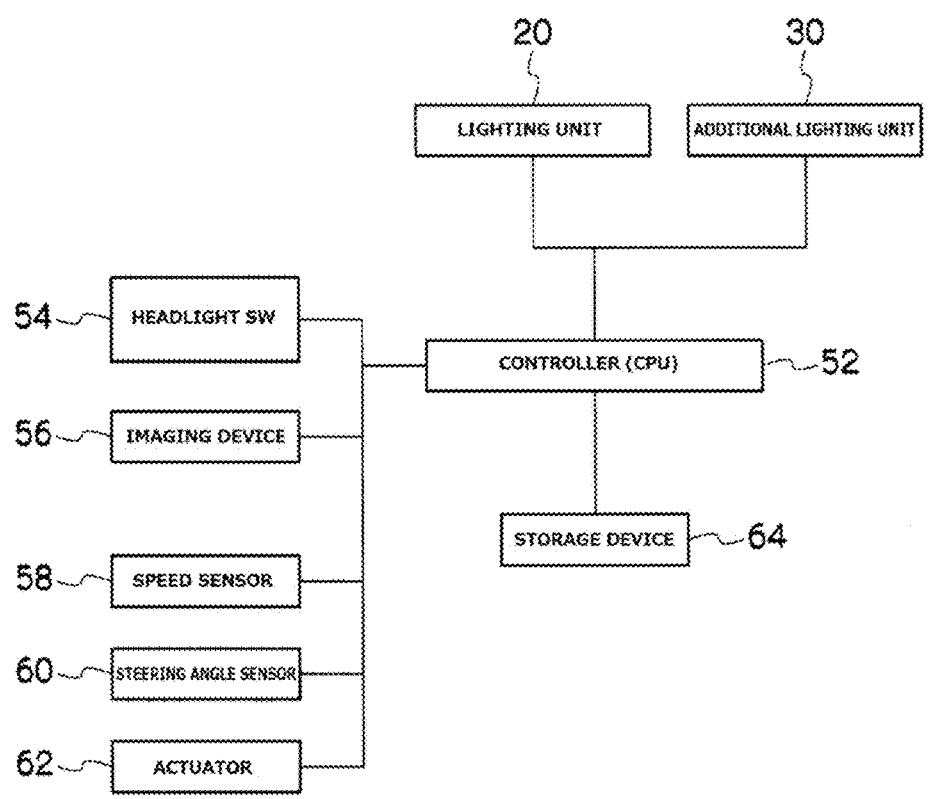
FIG. 9 is a block diagram illustrating an example of a system configuration configured to control the vehicle headlight 10.

FIG. 9 is a block diagram illustrating an example of the system configuration configured to control the vehicle headlight 10.

As illustrated, the system can include a controller 52 such as a CPU responsible for controlling the entire operation of the system. The system can further include the lighting unit 20, the additional lighting unit 30, a headlight switch 54, an imaging device 56 (such as a CCD camera, a stereo camera, or the like), a vehicle speed sensor 58, a steering angle sensor 60, the actuator 62, a storage device 64, and a RAM (not illustrated) serving as a work area for a CPU, which are connected to the controller 52 via a bus. The actuator 62 can be configured to be connected to the respective lighting units 20 and 30 to swivel the same in the left-right direction around the respective vertical axes. The storage device 64 can be a ROM including a program storing unit in which various programs executed by the controller 52 can be stored.

A description will next be given of an example of an operation of the vehicle headlight 10 with the above-mentioned configuration.

Figure 10:
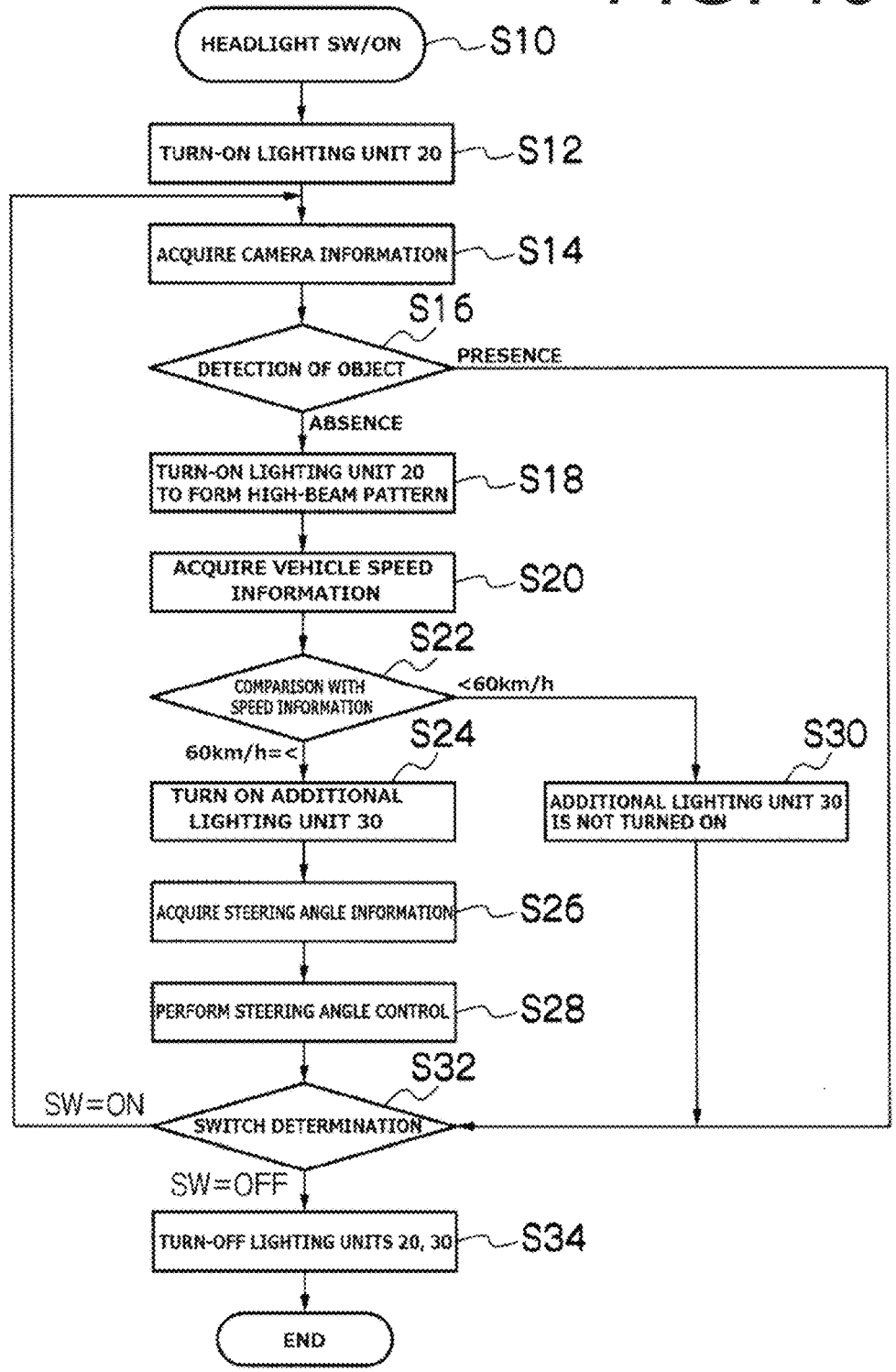
FIG. 10 is a flow chart showing an example of an operation of the vehicle headlight 10.

FIG. 10 is a flow chart showing the example of the operation of the vehicle headlight 10.

The following process can be achieved by causing the controller 52 to execute a predefined program read out from the storage device 64 into the not-illustrated RAM.

First, when the headlight switch 54 is turned on (Step S10), the lighting unit 20 can be turned on to form a low-beam light distribution pattern (Step S12).

Next, the imaging device 56 can capture image to acquire camera information (Step S14). On the basis of the captured image, irradiation-inhibition object detection process can be executed. The irradiation-inhibition object detection process is to detect an object (preceding vehicles, oncoming vehicles, pedestrians, etc.), which is inhibited from being irradiated with light, within the image captured by the imaging device 56. The process may be any of publicly known processes. If no irradiation-inhibition object is detected (Step S16: No), the lighting unit 20 can be caused to form the high-beam light distribution pattern $P_{Hi1}$ (Step S18).

Next, the vehicle speed sensor 58 can acquire vehicle speed information (Step S20), and the controller 52 can determine whether the vehicle speed contained in the vehicle speed information is equal to or exceed a predetermined threshold value (for example, 60 km/h) or not (Step S22). If the vehicle speed is determined to be larger than the threshold value (Step S22: equal to or higher than 60 km/h), the additional lighting unit 30 can be controlled to be turned on to form the high-beam additional light distribution pattern $P_{Hi2}$ and the turning-on perceptible light distribution pattern $P_{Hi3}$ (Step S24).

In this manner, the high-beam additional light distribution pattern $P_{Hi2}$ to be overlaid on the high-beam light distribution pattern $P_{Hi1}$ can additionally be formed to improve the distant visibility. Furthermore, the turning-on perceptible light distribution pattern $P_{Hi3}$ can additionally be formed on the road surface in front of the vehicle body in addition to the high-beam additional light distribution pattern $P_{Hi2}$, thereby causing a driver to feel the sense of turning-on.

At that time, the light directed to or near the lower end edge (cut-off line) of the high-beam additional light distribution pattern $P_{Hi2}$ can be diffused in the vertical direction by the action of the vertically diffusing portions 32a and 32b of the projector lens 32. This configuration can form the high-beam additional light distribution pattern $P_{Hi2}$ with the lower end edge (cut-off line) thereof being blurred. As a result, the effect of chromatic aberration generated at or near the lower end edge (cut-off line) of the high-beam additional light distribution pattern $P_{Hi2}$ can be suppressed. In addition, the illumination intensity between the high-beam additional light distribution pattern $P_{Hi2}$ and the turning-on perceptible light distribution pattern $P_{Hi3}$ can be gradually varied, thereby improving the sense of light distribution.

Next, the steering angle sensor 60 can acquire steering angle information (Step S26), and the controller 58 can perform the steering angle control based on the steering angle information (Step S28). Here, the steering angle control is to control the swivel direction and swivel angle of the lighting unit 20 and/or the additional lighting unit 30 in conjunction with the rotation direction and rotation angle of a steering wheel. The process may be any of publicly known processes. The swivel direction and swivel angle of the lighting unit 20 and/or the additional lighting unit 30 can be determined as follows. For example, the rotation directions and the rotation angles (amounts) of the steering wheel can be stored in the storage device 64 in association with the rotation directions and the rotation amounts (swivel directions and swivel angles) of the lighting unit 20 and the additional lighting unit 30 in advance as a table. With reference to the table, the controller 52 can determine the rotation directions and rotation amounts (swivel directions and swivel angles) of the lighting unit 20 and the additional lighting unit 30 in accordance with the acquired rotation direction and rotation angle (amount) of the steering wheel.

On the other hand, if the vehicle speed in the vehicle speed information is determined to be less than the threshold value (Step S22, lower than 60 km/h), the additional lighting unit 30 is not turned on (Step S30).

The process of steps S14 to S30 can be repeated until the headlight switch 54 is turned off (Step S32: SW=ON). If the headlight switch 54 is turned off (Step S32: SW=OFF), both the lighting units 20 and 30 are turned off (Step S34) to end the process.

In the vehicle headlight 10 configured to form the high-beam additional light distribution pattern $P_{Hi2}$ to be overlaid on the high-beam light distribution pattern $P_{Hi1}$ with the above-mentioned configuration, when the high-beam additional light distribution pattern $P_{Hi2}$ is additionally formed, a driver can be caused to feel the sense of turning-on because of the formation of the turning-on perceptible light distribution pattern $P_{Hi3}$ together with the high-beam additional light distribution pattern $P_{Hi2}$.

In addition, the vehicle headlight 10 with this configuration can cause the swivel mechanism to move (swivel or rotate) the formation positions of the high-beam additional light distribution pattern $P_{Hi2}$ and the turning-on perceptible light distribution pattern $P_{Hi3}$ in the left-right direction, thereby achieving the guiding of the line of sight of a driver.

A description will next be given of a modified example.

In the aforementioned exemplary embodiment, the single additional lighting unit 30 can form the high-beam additional light distribution pattern $P_{Hi2}$ and the turning-on perceptible light distribution pattern $P_{Hi3}$. However, a plurality of additional lighting units can form a high-beam additional light distribution pattern and a turning-on perceptible light distribution pattern, respectively, as long as the advantageous effects of the presently disclosed subject matter can be exerted.

In the aforementioned exemplary embodiment, the configuration can include the front-side reflecting surface 38 and the projector lens 32 configured such that the second focal point $F2_{38}$ of the front-side reflecting surface 38 can be set above and forward of the rear-side focal point $F_{32}$ of the projector lens 32. However, the second focal point $F2_{38}$ of the front-side reflecting surface 38 may be set at a position except for above and front of the rear-side focal point $F_{32}$ of the projector lens 32, for example, below the rear-side focal point $F_{32}$ of the projector lens 32 as long as the advantageous effects of the presently disclosed subject matter can be exerted.

Figure 11A:
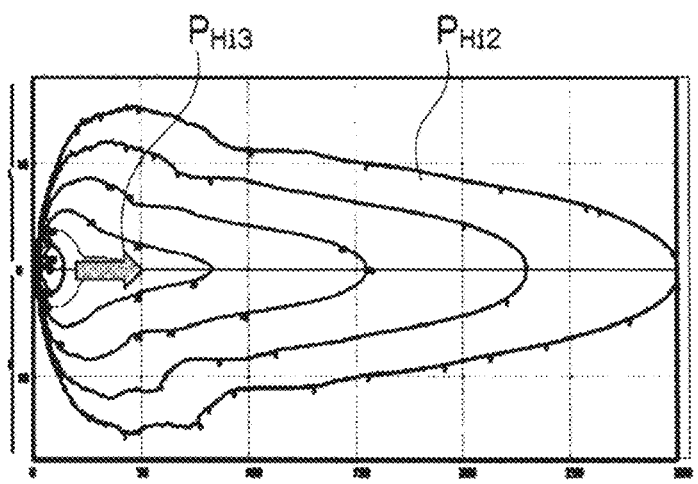
FIGS. 11A and 11B are diagrams showing light distribution obtained by a modified example of the vehicle headlight 10.
Figure 11B:
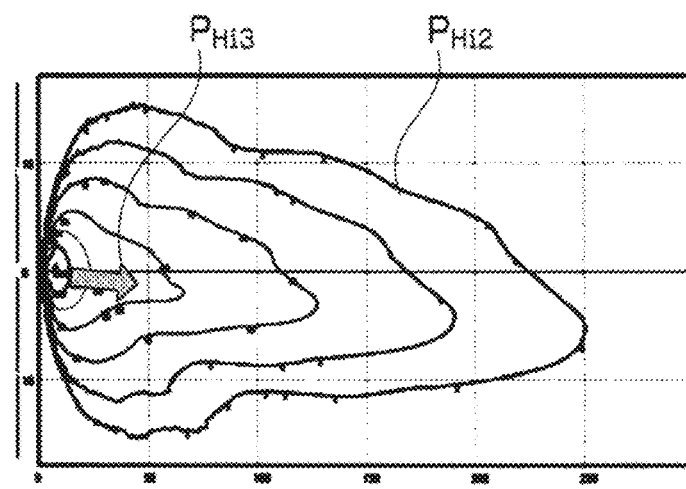

In the aforementioned exemplary embodiment, the configuration can form the turning-on perceptible light distribution pattern $P_{Hi3}$ as a streaky pattern. However, the turning-on perceptible light distribution pattern $P_{Hi3}$ can be formed to show a letter(s), a diagram, a sign, or the like. A concrete example thereof can be an arrow pattern illustrated in FIGS. 11A and 11B. The pattern showing a letter(s), a diagram, a sign, or the like can be formed as follows. For example, a patterned shade can be formed to have an opening (an opening having a shape corresponding an arrow when in FIGS. 11A and 11B) corresponding to the pattern to be formed by the turning-on perceptible light distribution pattern $P_{Hi3}$, and the lighting unit can cause concentrated light from a light source to pass through the opening of the patterned shade to project the patterned light via the projector lens to reproduce the shape of the opening on a road surface in front of the vehicle body like illustrated in FIGS. 11A and 11B.

Figure 12:
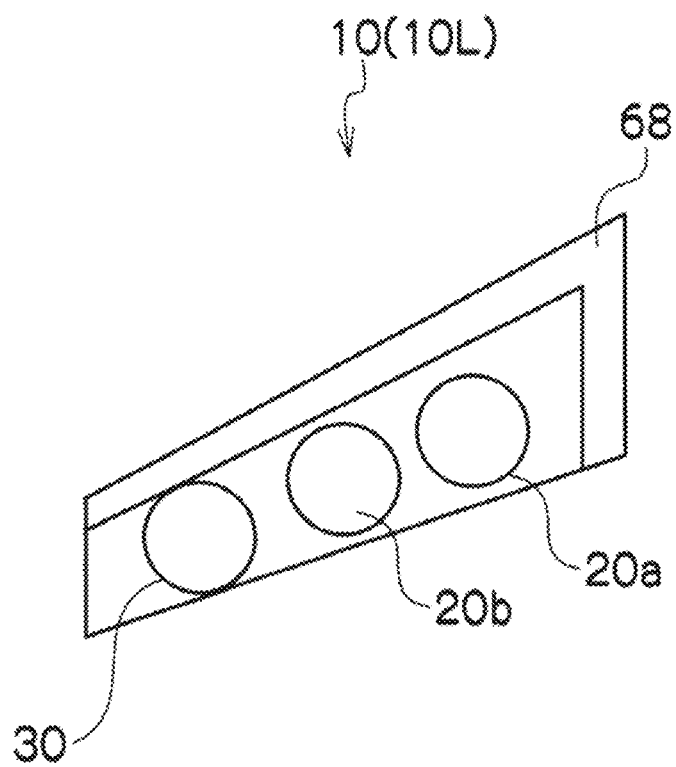
FIG. 12 is a schematic view illustrating a modified example of the vehicle headlight 10.

In the aforementioned exemplary embodiment, the configuration can include the lighting unit 20 configured to project high-beam light as well as low-beam light. However, the vehicle headlight can separately include a low-beam dedicated lighting unit 20a and a high-beam dedicated lighting unit 20b as illustrated in FIG. 12 as long as the advantageous effects of the presently disclosed subject matter can be exerted. Here, the high-beam dedicated lighting unit 20b can be a commonly known high-beam lighting unit or a light-distribution variable lighting unit (ADB (adaptive driving beam) unit).

In the aforementioned exemplary embodiment, the configuration can control the swivel directions and swivel angles of the lighting unit 20 and the additional lighting unit 30 in conjunction with the rotation direction and rotation angle of the steering wheel. However, the swivel directions and swivel angles of the lighting unit 20 and the additional lighting unit 30 can be controlled by the following method. For example, information of the vehicle and its surroundings, such as the vehicle location, a corner position in front of the vehicle body and a radius of curvature of the corner, and the like from a car navigation device is acquired in advance, and the swivel directions and swivel angles of the lighting unit 20 and the additional lighting unit 30 can be controlled in accordance with the acquired radius of curvature of the corner and a distance to the corner, and the like on the basis of the acquired information.

In the aforementioned exemplary embodiment, the configuration can include the concurrent rotation (swivel) of the lighting unit 20 and the additional lighting unit 30. However, only the additional lighting unit 30 may be swiveled as long as the advantageous effects of the presently disclosed subject matter can be exerted.

In the aforementioned exemplary embodiment, the configuration can automatically form the high-beam additional light distribution pattern $P_{Hi2}$ and the turning-on perceptible light distribution pattern $P_{Hi3}$ on the basis of the vehicle speed information, the steering angle information, the information from a car navigation device, and the like. However, any manual switch can be provided to allow a driver to manually switch the operation to form the high-beam additional light distribution pattern $P_{Hi2}$ and the turning-on perceptible light distribution pattern $P_{Hi3}$.

Furthermore, the various numerical values shown in the exemplary embodiment(s) and the modified example(s) are illustrative and various suitable numerical values can be adopted as long as the advantageous effects of the presently disclosed subject matter can be exerted.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture configured to form a high-beam light distribution pattern and a high-beam additional light distribution pattern to be overlaid on the high-beam light distribution pattern, the vehicle lighting fixture being configured to further form a turning-on perceptible light distribution pattern having a higher intensity near a vehicle body, on which the vehicle lighting fixture is installed, together with the high-beam additional light distribution pattern, comprising:
   a lighting unit configured to simultaneously form the high-beam additional light distribution pattern and the turning-on perceptible light distribution pattern, wherein:
   the lighting unit includes
      a projector lens having a rear-side focal point,
      a light source disposed behind the rear-side focal point of the projector lens and configured to emit light downward,
      a front-side reflecting surface and a rear-side reflecting surface both disposed below the light source,
      a rear-side shade configured to extend from a position at or near the rear-side focal point of the projector lens toward the light source, and a front-side shade configured to extend from a front end edge of the rear-side shade to the projector lens forward and obliquely upward;
   the rear-side reflecting surface is configured to reflect and converge the light from the light source to the rear-side shade at or near the rear-side focal point of the projector lens so that the reflected and converged light is projected forward through the projector lens to form the high-beam additional light distribution pattern; and
   the front-side reflecting surface is configured to reflect and converge the light from the light source to the front-side shade at or near the rear-side focal point of the projector lens so that the reflected and converged light is projected forward through the projector lens to form the turning-on perceptible light distribution pattern.

2. The vehicle lighting fixture according to claim 1, wherein:
   the rear-side reflecting surface is configured to be an ellipsoidal reflecting surface having a first focal point set at or near the light source and a second focal point set at or near the rear-side focal point of the projector lens; and
   the front-side reflecting surface is configured to be an ellipsoidal reflecting surface having a first focal point set at or near the light source and a second focal point set above and forward of the rear-side focal point of the projector lens.

3. The vehicle lighting fixture according to claim 2, wherein the projector lens includes a vertically diffusing portion configured to vertically diffuse light that is directed to or near a lower end edge of the high-beam additional light distribution pattern.

4. The vehicle lighting fixture according to claim 1, wherein the projector lens includes a vertically diffusing portion configured to vertically diffuse light that is directed to or near a lower end edge of the high-beam additional light distribution pattern.

5. The vehicle lighting fixture according to claim 1, wherein the high-beam additional light distribution pattern and the turning-on perceptible light distribution pattern are controlled to be formed when a vehicle speed of the vehicle body on which the vehicle lighting fixture is installed reaches a predetermined vehicle speed or higher.

6. A vehicle lighting fixture configured to form a high-beam light distribution pattern and a high-beam additional light distribution pattern to be overlaid on the high-beam light distribution pattern, the vehicle lighting fixture being configured to further form a turning-on perceptible light distribution pattern having a higher intensity near a vehicle body, on which the vehicle lighting fixture is installed, together with the high-beam additional light distribution pattern, comprising:
   a lighting unit configured to simultaneously form the high-beam additional light distribution pattern and the turning-on perceptible light distribution pattern, wherein:
   the turning-on perceptible light distribution pattern has a width narrower than that of the high-beam additional light distribution pattern,
   the lighting unit includes
      a projector lens having a rear-side focal point,
      a light source disposed behind the rear-side focal point of the projector lens and configured to emit light downward,
      a front-side reflecting surface and a rear-side reflecting surface both disposed below the light source,
      a rear-side shade configured to extend from a position at or near the rear-side focal point of the projector lens toward the light source, and a front-side shade configured to extend from a front end edge of the rear-side shade to the projector lens forward and obliquely upward;
   the rear-side reflecting surface is configured to reflect and converge the light from the light source to the rear-side shade at or near the rear-side focal point of the projector lens so that the reflected and converged light is projected forward through the projector lens to form the high-beam additional light distribution pattern; and the front-side reflecting surface is configured to reflect and converge the light from the light source to the front-side shade at or near the rear-side focal point of the projector lens so that the reflected and converged light is projected forward through the projector lens to form the turning-on perceptible light distribution pattern.

7. A vehicle lighting fixture configured to form a high-beam light distribution pattern and a high-beam additional light distribution pattern to be overlaid on the high-beam light distribution pattern, the vehicle lighting fixture being configured to further form a turning-on perceptible light distribution pattern having a higher intensity near a vehicle body, on which the vehicle lighting fixture is installed, together with the high-beam additional light distribution pattern, comprising:
a lighting unit configured to simultaneously form the high-beam additional light distribution pattern and the turning-on perceptible light distribution pattern, and
a swivel mechanism configured to swivel the lighting unit in a left-right direction to move formation positions of the high-beam additional light distribution pattern and the turning-on perceptible light distribution pattern in the left-right direction, wherein:
the lighting unit includes
a projector lens having a rear-side focal point,
a light source disposed behind the rear-side focal point of the projector lens and configured to emit light downward,
a front-side reflecting surface and a rear-side reflecting surface both disposed below the light source,
a rear-side shade configured to extend from a position at or near the rear-side focal point of the projector lens toward the light source, and a front-side shade configured to extend from a front end edge of the rear-side shade to the projector lens forward and obliquely upward;
the rear-side reflecting surface is configured to reflect and converge the light from the light source to the rear-side shade at or near the rear-side focal point of the projector lens so that the reflected and converged light is projected forward through the projector lens to form the high-beam additional light distribution pattern; and
the front-side reflecting surface is configured to reflect and converge the light from the light source to the front-side shade at or near the rear-side focal point of the projector lens so that the reflected and converged light is projected forward through the projector lens to form the turning-on perceptible light distribution pattern.

8. The vehicle lighting fixture according to claim 7, wherein:
the rear-side reflecting surface is configured to be an ellipsoidal reflecting surface having a first focal point set at or near the light source and a second focal point set at or near the rear-side focal point of the projector lens; and
the front-side reflecting surface is configured to be an ellipsoidal reflecting surface having a first focal point set at or near the light source and a second focal point set above and forward of the rear-side focal point of the projector lens.

9. The vehicle lighting fixture according to claim 8, wherein the projector lens includes a vertically diffusing portion configured to vertically diffuse light that is directed to or near a lower end edge of the high-beam additional light distribution pattern.

10. The vehicle lighting fixture according to claim 7, wherein the projector lens includes a vertically diffusing portion configured to vertically diffuse light that is directed to or near a lower end edge of the high-beam additional light distribution pattern.

11. A vehicle lighting fixture configured to form a high-beam light distribution pattern and a high-beam additional light distribution pattern to be overlaid on the high-beam light distribution pattern, the vehicle lighting fixture being configured to further form a turning-on perceptible light distribution pattern having a higher intensity near a vehicle body, on which the vehicle lighting fixture is installed, together with the high-beam additional light distribution pattern, comprising:
a lighting unit configured to simultaneously form the high-beam additional light distribution pattern and the turning-on perceptible light distribution pattern, and
a swivel mechanism configured to swivel the lighting unit in a left-right direction to move formation positions of the high-beam additional light distribution pattern and the turning-on perceptible light distribution pattern in the left-right direction, wherein:
the turning-on perceptible light distribution pattern has a width narrower than that of the high-beam additional light distribution pattern,
the lighting unit includes
a projector lens having a rear-side focal point,
a light source disposed behind the rear-side focal point of the projector lens and configured to emit light downward,
a front-side reflecting surface and a rear-side reflecting surface both disposed below the light source,
a rear-side shade configured to extend from a position at or near the rear-side focal point of the projector lens toward the light source, and a front-side shade configured to extend from a front end edge of the rear-side shade to the projector lens forward and obliquely upward;
the rear-side reflecting surface is configured to reflect and converge the light from the light source to the rear-side shade at or near the rear-side focal point of the projector lens so that the reflected and converged light is projected forward through the projector lens to form the high-beam additional light distribution pattern; and
the front-side reflecting surface is configured to reflect and converge the light from the light source to the front-side shade at or near the rear-side focal point of the projector lens so that the reflected and converged light is projected forward through the projector lens to form the turning-on perceptible light distribution pattern.

* * * * *